United States Patent
Perrufel et al.

(10) Patent No.: US 10,455,423 B2
(45) Date of Patent: Oct. 22, 2019

(54) CONTROL OF ACCESS TO AN ON-LINE SERVICE VIA A LI-FI NETWORK

(71) Applicant: ORANGE, Paris (FR)

(72) Inventors: Micheline Perrufel, Pace (FR); Philippe Dussaume, Tremblay (FR); Olivier Bouchet, Rennes (FR); Sylvain Leroux, Paris (FR); Olivier Helaine, Montgeron (FR)

(73) Assignee: ORANGE, Paris (FR)

( * ) Notice: Subject to any disclaimer, the term of this patent is extended or adjusted under 35 U.S.C. 154(b) by 0 days.

(21) Appl. No.: 16/061,791

(22) PCT Filed: Nov. 29, 2016

(86) PCT No.: PCT/FR2016/053132
§ 371 (c)(1),
(2) Date: Jun. 13, 2018

(87) PCT Pub. No.: WO2017/103371
PCT Pub. Date: Jun. 22, 2017

(65) Prior Publication Data
US 2018/0359640 A1    Dec. 13, 2018

(30) Foreign Application Priority Data

Dec. 15, 2015 (FR) ...................... 15 62355

(51) Int. Cl.
*H04W 12/08* (2009.01)
*H04B 10/112* (2013.01)
(Continued)

(52) U.S. Cl.
CPC .......... *H04W 12/08* (2013.01); *H04B 10/116* (2013.01); *H04B 10/1129* (2013.01);
(Continued)

(58) Field of Classification Search
None
See application file for complete search history.

(56) References Cited

U.S. PATENT DOCUMENTS

2008/0281515 A1  11/2008 Ann et al.
2009/0310971 A1  12/2009 Kim et al.
(Continued)

*Primary Examiner* — Darren E Wolf
(74) *Attorney, Agent, or Firm* — Drinker Biddle & Reath LLP

(57) ABSTRACT

Control of access to an on-line service, the access to the service being requested, via a communication network, by a terminal suitable for receiving data broadcast by a plurality of devices for data transmission by light modulation producing a light beam. In particular: each transmission device is characterized by a unique identifier; and each transmission device belongs to a group of devices. The following steps, carried out by a server connected to the transmission devices, are provided: upon receiving a request from the terminal to access the service via a second transmission device identified by a second identifier, verifying whether a previous access request for said same terminal was accepted for a first transmission device identified by a first identifier; and, when the first and second identifiers correspond to devices of the same group, processing the access request.

11 Claims, 3 Drawing Sheets

(51) Int. Cl.
*H04B 10/114* (2013.01)
*H04B 10/116* (2013.01)
*H04W 12/04* (2009.01)
*H04B 10/60* (2013.01)
*H04B 10/40* (2013.01)
*H04B 10/50* (2013.01)

(52) U.S. Cl.
CPC ..... *H04B 10/1143* (2013.01); *H04B 10/1149* (2013.01); *H04W 12/04* (2013.01); *H04B 10/40* (2013.01); *H04B 10/50* (2013.01); *H04B 10/60* (2013.01)

(56) References Cited

U.S. PATENT DOCUMENTS

| | | | |
|---|---|---|---|
| 2011/0302616 A1* | 12/2011 | Mizukami | H04B 10/1149 725/76 |
| 2012/0008959 A1 | 1/2012 | Son et al. | |
| 2012/0179906 A1* | 7/2012 | Choi | H04L 9/0891 713/155 |

\* cited by examiner

CONTROL OF ACCESS TO AN ON-LINE SERVICE VIA A LI-FI NETWORK

CROSS-REFERENCE TO RELATED APPLICATIONS

This application is the U.S. national phase of the International Patent Application No. PCT/FR2016/053132 filed Nov. 29, 2016, which claims the benefit of French Application No. 15 62355 filed Dec. 15, 2015, the entire content of which is incorporated herein by reference.

FIELD

The present invention relates to the field of data communications transmitted by light modulation producing a beam of light ("Li-Fi" below).

BACKGROUND

Illustrated in FIG. 1 is an example application of this type of communication. A computer 11 (or a server or other) is connected for example to the power grid by a power-line communication device 10 (or to an Ethernet network via an Ethernet cable). The computer 11 is also connected to a wide area network such as the Internet 12. The computer 11 can thus connect to the Internet for a particular service (presentation of web pages or other service) and, upon receipt of these service data, send them to the device 10. The computer 11 indicates in particular the IP address of a device 14 having one or more LED (light-emitting diode) bulbs 141, 142, 143 and a Li-Fi router 13 connected to device 10 transmits these data to transmission device 14. For example, these bulbs emit light in the visible spectrum, in accordance with IEEE 802.15.7® (2011).

The device 14 is equipped with a digital encoder that allows it to transmit the information received and to modulate it (or demodulate it, particularly in the case where the device 14 comprises photoreceptors for receiving light signals from the terminals D1, D2, D3). The electrical pulses received between the router 13 and the device 14 are then converted into light pulses (or vice versa). In the example shown in FIG. 1, the device 14 comprises a plurality of bulbs that simultaneously emit the same light beam, turning on and off at a very high frequency (beyond the persistence of vision). For decoding the data thus received, the terminals D1, D2, D3, placed under the light beam, are equipped with a photodetector coupled to an integrated digital demodulator.

Each of the terminals D1, D2, D3 (smart phone, tablet, or other devices) thus receives the same data from the computer 11. However, some terminals (D1, D2, for example) may be subscribing to specific services, and others (D3) are not. It is then necessary to distinguish between the different content to be communicated to different terminals, by different respective bulbs.

Furthermore, to receive these data (or more generally simply to access the Internet upon request), these terminals D1, D2, D3 must be located within the illuminated area covered the bulbs. No possibility for mobility for the users of such terminals is provided. Specifically, if a terminal D3 moves from an area covered by device 14 to an area covered by device 15 of FIG. 1, in principle the terminal is expected to repeat an authentication procedure (and to do so systematically with each change of transmission device during its movement, from 15 to 16, etc.).

The present invention improves the situation.

SUMMARY

For this purpose, it proposes a method for controlling access to an online service, the access to the service being requested, via a communication network, by a terminal suitable for receiving data broadcast by a plurality of data transmission devices by light modulation producing a beam of light. In particular:
  each transmission device is characterized by a unique identifier,
  each transmission device belongs to a group of devices.

The method then comprises the following steps implemented by a server connected to the transmission devices:
  upon receiving a request from the terminal to access the service via a second transmission device identified by a second identifier, verifying whether a previous access request for the same terminal was accepted for a first transmission device identified by a first identifier, and when the first and second identifiers correspond to devices of the same group, processing the access request.

Thus, if it is desired to send for example a large number of different content streams for different devices (with, as shown in FIG. 1, a distinction for example between terminals D1, D2 subscribed to a service, and other non-subscribed terminals D3), use is made of multiple transmission devices 15, 16 or addressing for each individual bulb. For example, each bulb may possibly also have an individual modem/router (for example in its base). In what follows, "transmission device" is considered to refer without distinction to a device with a single bulb or with multiple bulbs emitting the same data.

Each transmission device thus has an identifier (for example a fixed IP address). For example, for transmission of data related to a service reserved for subscriber terminals, the data broadcast by some bulbs may be encrypted and accompanied by the identifier of each bulb, and the data received by the subscriber terminals D1, D2 may be decrypted with a private key.

In particular, each identifier is included in a group (GP1, GP2, GP3, as shown in FIG. 2 and described in more detail below). Such an embodiment allows both:
  managing specific transmissions (for subscriber terminals for example) within the same restricted group of devices, and
  ensuring continuity in transmission, particularly in a case of terminal mobility between two devices of the same group (ID2, ID3, then ID4, as shown in the example of FIG. 2).

In one embodiment, the method further comprises a step of:
  disconnecting the terminal in response to the access request when the first and second identifiers do not correspond to devices of the same group.

Thus, in this case, for example the terminal user must reauthenticate with the second device in order to have access (or not) to the service (after verification).

In one embodiment, the identifier of at least one transmission device belongs to multiple groups at the same time.

Thus, in this embodiment, if each group is associated with a predetermined geographical area, a transmission device whose identifier belongs to two groups at the same time is able to provide the terminal with continuity of access to the service between two geographical areas as the terminal moves between these two geographical areas.

In one embodiment, each access request from a terminal may comprise an identifier of the terminal and an identifier of the transmission device through which access to the service is requested by that terminal. This implementation enables the server to find out whether the terminal was already communicating with a device of the same group. For example, the terminal identifier may be transmitted with each access request to the server, and stored at least temporarily in a memory of the server in order to be able to determine at a later time whether a previous access request was previously accepted for the terminal having this same identifier with a device of the same group.

In one embodiment where a time delay is also taken into account, the access request is processed:
 when the first and second identifiers correspond to devices of the same group,
 and if the previous access request was granted for the first device within a shorter time than said time delay.

In one embodiment, the transmission of data at least towards the terminal (and possibly the reverse path for the data) can be protected by encryption. In this case, for example a shared encryption key may be assigned to transmission devices of the same group.

The invention also provides a computer program comprising instructions for implementing the above method, when this program is executed by a processor. As an example, a flow chart of one possible algorithm for such a program is represented in FIG. 3.

The invention also provides a server for controlling access to an online service, comprising a digital circuit connected to a database (denoted MEM in FIG. 2) storing the groups of identifiers of transmission devices for implementing the above method.

BRIEF DESCRIPTION OF THE DRAWINGS

Other features and advantages of the invention will be apparent upon examining the following detailed description and the attached drawings in which.

DETAILED DESCRIPTION

Figure 2:
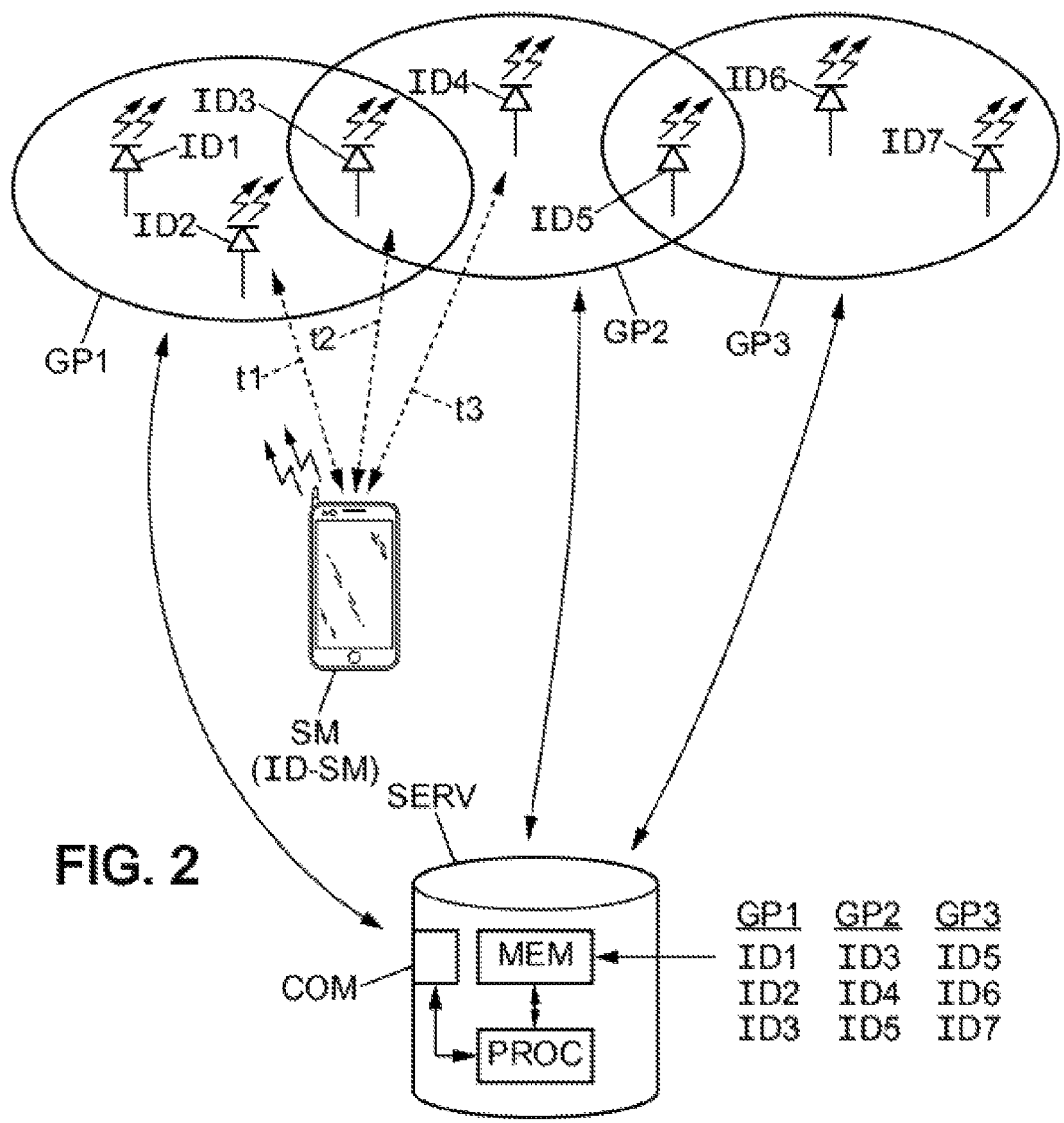
FIG. 2 schematically illustrates a system comprising a plurality of transmission devices for implementing the invention.

We will now refer to FIG. 2, in which a plurality of transmission devices, having the respective identifiers ID1 to ID7, are connected to a common server SERV which typically comprises a digital circuit including for example:
 a communication interface COM, in particular for communicating with the transmission devices, connected to
 a processor PROC, cooperating with
 a memory unit MEM capable of storing temporary data, as well as permanent data such as the instructions of a computer program within the meaning of the invention, as well as identifier data stored in distinct groups GP1, GP2, GP3 in a database.

Thus, a terminal SM (having the identifier ID-SM) may be in communication with a transmission device of identifier ID2 at time t1. When establishing the connection with device ID2, the latter simply transmits the identifier ID-SM to the server SERV.

The server SERV stores this identifier ID-SM (typically as part of said temporary data) in association with the identifier ID2. Then, in case of mobility of the terminal SM, such that it receives at a subsequent time t2 the beam from another transmission device of identifier ID3, the terminal SM attempts to connect to this device ID3 (for example to have better reception than with the previous device ID2). To this end, the terminal SM transmits its identifier to the new device ID3 which sends this identifier ID-SM to the server SERV.

The server therefore receives a new request for association between identifiers ID-SM and ID3, for a terminal of identifier ID-SM already present in the memory MEM. The server SERV is thus able to determine, for the terminal SM, whether the two identifiers of devices ID2 and ID3 are in the same group GP1 in its database.

If such is the case, then the request to connect the terminal to device ID3 can be accepted. Otherwise, it is rejected.

Thus, a terminal can be moved from one group GP1 to another GP2, in different geographical areas for example, if at least one transmission device ID3 belongs to both groups at the same time, as shown in the example in FIG. 2.

Figure 3:
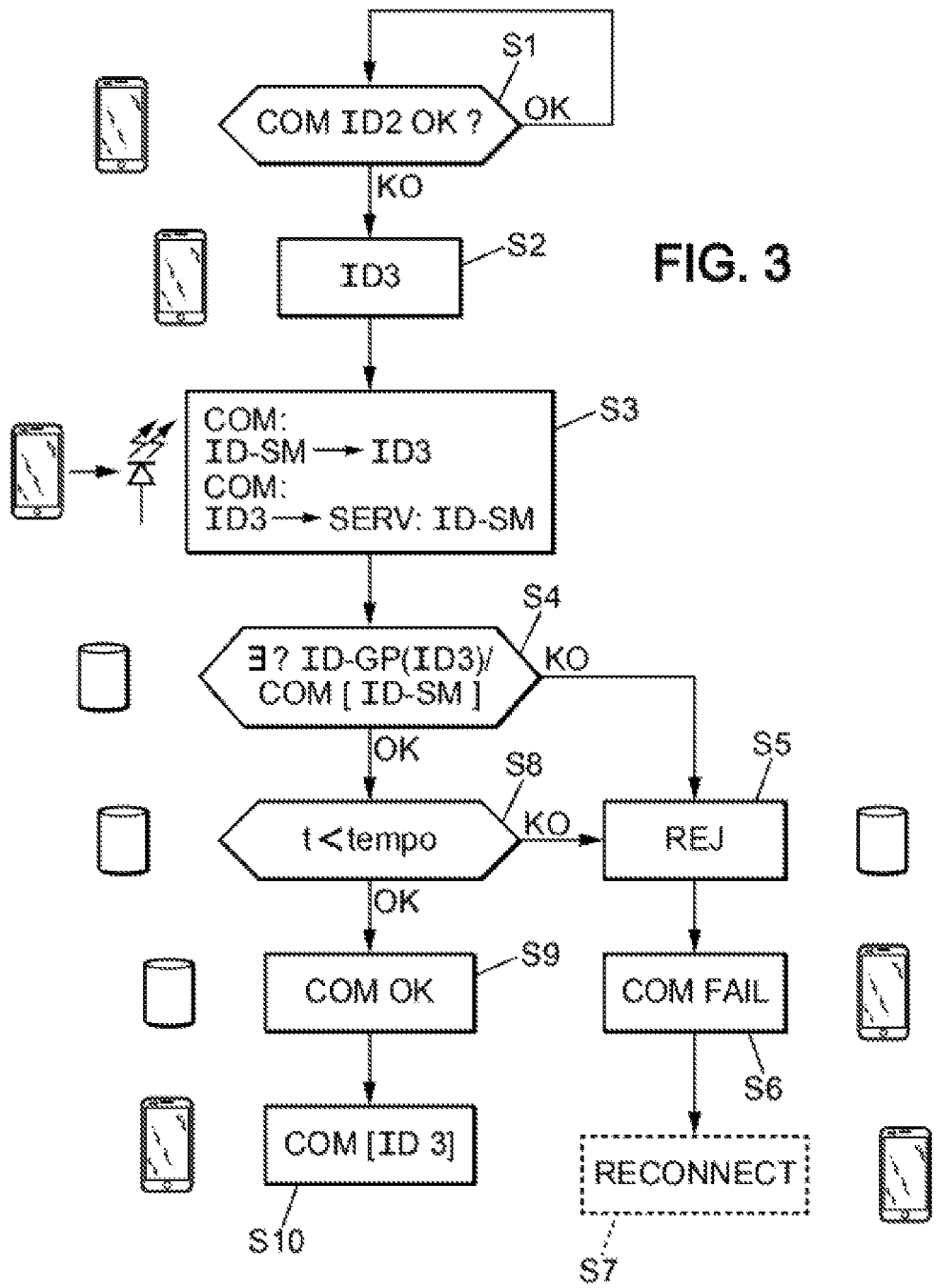
FIG. 3 shows an example of steps implemented in the context of a method according to the invention.

We now refer to FIG. 3 which details the steps of the mobility situation illustrated in FIG. 2, in an exemplary embodiment. In a first step SI, as long as the communication of the terminal SM with the transmission device of identifier ID2 is of satisfactory quality for example, the terminal SM remains connected to device ID2 (OK arrow). In contrast, for example for a signal-to-noise ratio below a threshold (KO arrow exiting test S1), the terminal can attempt to connect with a new neighboring device, for example of identifier ID3, in step S2. In this case, in step S3, the terminal communicates its identifier ID-SM to device ID3, which is then relayed to the server SERV.

In step S4, the server SERV checks its database and its memory MEM to see if there is an identifier (for example ID2) of the same group GP1 as the new device of identifier ID3 and which was previously in communication with the terminal of identifier ID-SM.

If this is not the case (KO arrow exiting test S4), then the request to access the service of the terminal SM via device ID3 is rejected in step S5. In step S6, the terminal can be notified of the rejection. The user can, in step S7, attempt to reconnect to another device (or to the same device ID3 if a time delay is implemented, described below with reference to step S8).

If the identifier of the new transmission device ID3 is indeed identified in the same group GP1 as the former device ID2 (OK arrow exiting test S4), in one exemplary embodiment a "delay" routine is applied in step S8, as follows: the server determines a time difference between when the terminal connected to the previous device ID2 and its connection attempt to the new device ID3. If this time difference t is greater than a delay threshold denoted "tempo" (KO arrow exiting test S8), it means that this is a new connection attempt, in absolute terms, of the terminal with the device ID3 and it is then appropriate to recheck the authorization to access the terminal service. It is not then a simple data transmission relay between device ID2 and device ID3: in such case, the access request is rejected (step S5), and the user of the terminal SM must then reconnect once again in order to access the service (step 57), for example by providing an access code or the like.

However, if the aforementioned time difference is less than the "tempo" threshold (OK arrow exiting test S8), then device ID3 receives authorization in step S9 to connect to the terminal SM and communication can thus be continued between device ID3 and the terminal SM in step S10.

For example, said delay can be implemented by referring to a clock that may be comprised in the processor PROC (for example by running a "time in/time out" type of routine).

Of course, the invention is not limited to the embodiments described above as an example; it extends to other variants.

Regarding the bulb identifiers discussed above, any type of identifier can be attributed to a bulb, in particular enabling precise control of the stream of data which can be labeled as coming from that bulb or routed towards that bulb.

Said terminal identifier may further be a user identifier (a user typically having multiple terminals). It may be an IMSI identifier (provided to the server after a declaration procedure). Thus, while the terminal remains facing the same bulb, the access authorization for the service is still valid (a time delay may also optionally be implemented so that the access to the service over time will eventually be restricted without new identification).

Figure 1:
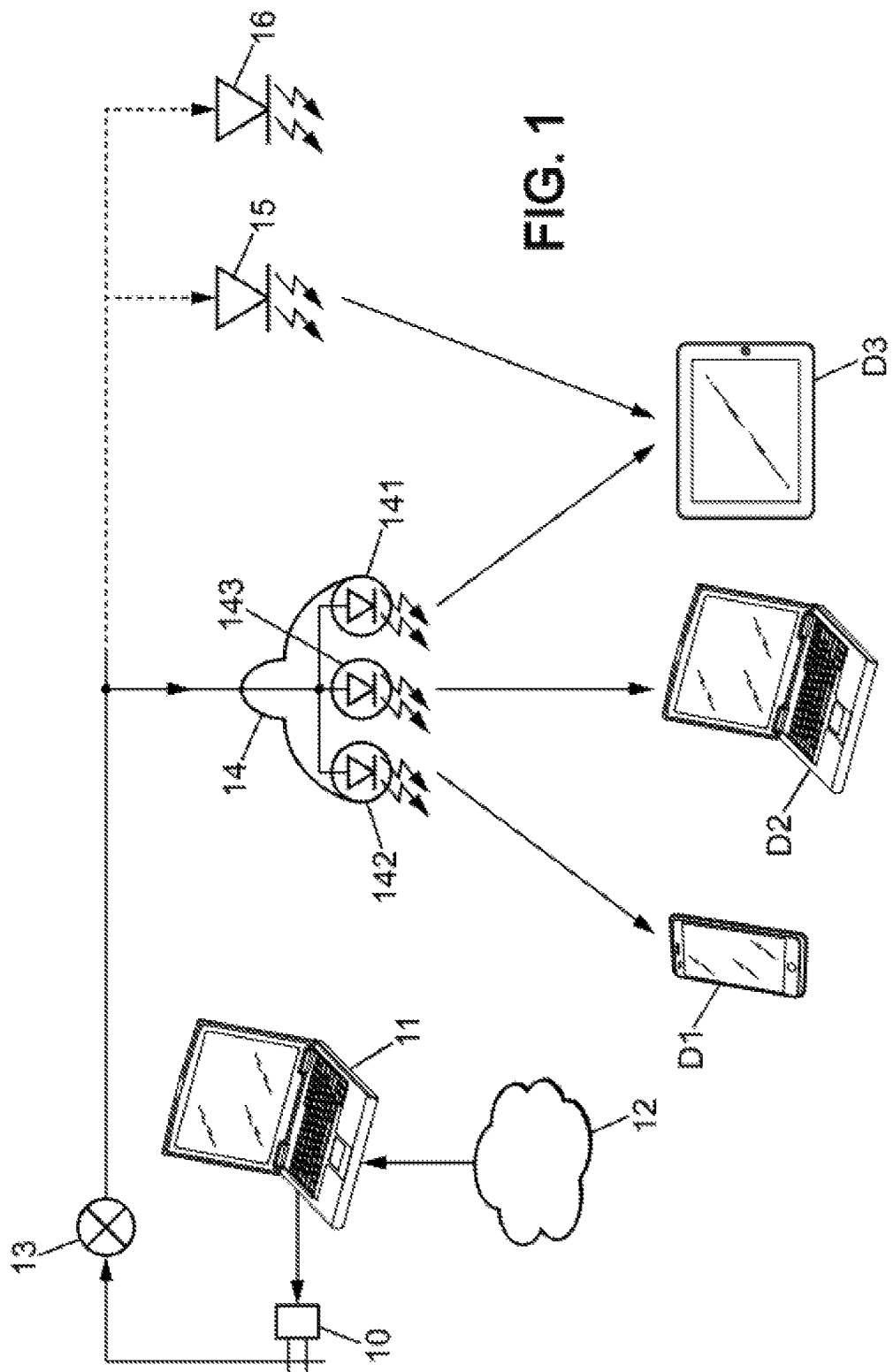
FIG. 1 illustrates an exemplary implementation of a service provided by a transmission device 14.

Said server SERV may for example be connected to multiple devices such as the computer 11 of FIG. 1, in order to manage different groups of transmission devices (connected for example to different computers for different services).

The invention claimed is:

1. A method for controlling access to an online service, the access to the service being requested, via a communication network, by a terminal suitable for receiving data broadcast by a plurality of data transmission devices, said devices producing a beam of light, said data broadcast being implemented by a modulation of said produced light beam, wherein:
    each transmission device is characterized by a unique identifier,
    each transmission device belongs to a group of devices, and wherein a server connected to the transmission devices implements:
    upon receiving a request from the terminal to access the service via a second transmission device from the plurality of data transmission devices identified by a second identifier, verifying whether a previous access request for the same terminal was accepted for a first transmission device from the plurality of data transmission devices identified by a first identifier,
    when the first and second identifiers correspond to devices of the same group, processing the access request by accepting the access request; and
    when the first and second identifiers do not correspond to devices of the same group, rejecting the access request.

2. The method according to claim 1, further comprising a step of:
    disconnecting the terminal in response to the access request when the first and second identifiers do not correspond to devices of the same group.

3. The method according to claim 1, wherein the identifier of at least one transmission device belongs to multiple groups at the same time.

4. The method according to claim 3, wherein each group is associated with a predetermined geographical area, and a transmission device whose identifier belongs to two groups at the same time is able to provide the terminal with continuity of access to the service between two geographical areas as the terminal moves between these two geographical areas.

5. The method according to claim 1, wherein each access request from a terminal comprises an identifier of the terminal and an identifier of the transmission device through which access to the service is requested by that terminal.

6. The method according to claim 1, wherein a time delay is also taken into account, and
    wherein the access request is processed when the first and second identifiers correspond to devices of the same group, and if said previous access request was granted for the first device within a shorter time than the time delay.

7. The method according to claim 1, wherein the transmission of data at least towards the terminal is protected by encryption, and wherein a shared encryption key is assigned to transmission devices of the same group.

8. The method according to claim 1, wherein the modulated light is within the visible spectrum.

9. A non-transitory computer storage medium storing instructions of a computer program wherein an execution of said instructions by a processor causes an implementation of the method according to claim 1.

10. A server for controlling access to an online service, wherein said server comprises a digital circuit connected to a database storing said groups of identifiers of transmission devices for implementing the method according to claim 1.

11. A method for controlling access to an online service, the access to the service being requested, via a communication network, by a terminal suitable for receiving data broadcast by a plurality of data transmission devices, said devices producing a beam of light, said data broadcast being implemented by a modulation of said produced light beam, wherein:
    each transmission device is characterized by a unique identifier,
    each transmission device belongs to a group of devices, and wherein a server connected to the transmission devices implements:
    upon receiving a request from the terminal to access the service via a second transmission device from the plurality of data transmission devices identified by a second identifier, verifying whether a previous access request for the same terminal was accepted for a first transmission device from the plurality of data transmission devices identified by a first identifier,
    when the first and second identifiers correspond to devices of the same group, processing the access request by accepting the access request, and
    when the first and second identifiers do not correspond to devices of the same group, not processing the access request.

* * * * *